United States Patent [19]
Young, Jr.

[11] Patent Number: 5,969,668
[45] Date of Patent: Oct. 19, 1999

[54] INTEGRATION OF AIME AUGMENTATION INTO GNSS PRODUCTS

[75] Inventor: James A. Young, Jr., Cedar Rapids, Iowa

[73] Assignee: Rockwell International Corporation, Costa Mesa, Calif.

[21] Appl. No.: 08/979,915

[22] Filed: Jul. 29, 1997

[51] Int. Cl.⁶ .................................................. H04B 7/185
[52] U.S. Cl. ........................................... 342/357; 701/200
[58] Field of Search ........................... 342/357; 701/200; 340/961

[56] References Cited

U.S. PATENT DOCUMENTS

| | | | |
|---|---|---|---|
| 5,512,903 | 4/1996 | Schmitke | 342/357 |
| 5,543,804 | 8/1996 | Buchler et al. | 342/357 |
| 5,583,774 | 12/1996 | Diesel | 701/200 |
| 5,714,948 | 2/1998 | Farmakis | 340/961 |

OTHER PUBLICATIONS

*AIME, Your Path to GPS Sole Means*, Litton Aero Products.
John Diesel and Gregory Dunn, GPS/IRS AIME: "Certification for Sole Means and Solution to RF Interference", Litton Aero Products.

*Primary Examiner*—Thomas Tarcza
*Assistant Examiner*—Devin Drummond
*Attorney, Agent, or Firm*—Kyle Eppele; James P. O'Shaughnessy

[57] ABSTRACT

A global navigation satellite system (GNSS) receiver for use in an aircraft is disclosed. The GNSS receiver includes receiver circuitry for receiving satellite signals containing satellite data from a multiple GNSS satellites. The receiver circuitry generates a first navigation solution for the aircraft as function of the satellite data. A first GNSS receiver output couples to an inertial reference system (IRS) and provides the satellite data to the IRS. The IRS generates a second navigation solution for the aircraft as a function of the satellite data and as a function of IRS position data. A first GNSS receiver input couples to the IRS and receives the second navigation solution from the IRS. The GNSS receiver provides at a second output aircraft position information as a function of the second navigation solution.

20 Claims, 3 Drawing Sheets

INTEGRATION OF AIME AUGMENTATION INTO GNSS PRODUCTS

CROSS REFERENCE TO RELATED APPLICATIONS

The present application makes reference to and incorporates by reference the following documents: (1) *AIME, Your Path to GPS Sole Means*, Litton Aero Products; (2) John Diesel and Gregory Dunn *GPS/IRS AIME: Certification for Sole Means and Solution to RF Interference*, Litton Aero Products; (3) U.S. Pat. No. 5,583,774 to Diesel entitled ASSURED INTEGRITY MONITORED-EXTRAPOLATION NAVIGATION APPARATUS and assigned to Litton Systems, Inc.; and (4) U.S. Pat. No. 5,543,804 to Buchler et al. entitled NAVIGATION APPARATUS WITH IMPROVED ATTITUDE DETERMINATION and assigned to Litton Systems, Inc.

FIELD OF THE INVENTION

The present invention relates to aviation electronics (avionics). More particularly, the present invention relates to a global navigation satellite system (GNSS) receiver such as a global positioning system (GPS) receiver which, with the aid of an augmentation algorithm, provides a navigation solution for use by various other aircraft systems.

BACKGROUND OF THE INVENTION

In the cockpit of an aircraft, a number of avionics systems, sometimes referred to as black boxes or line replaceable units (LRUs), are used to aid the flight crew in controlling the aircraft. Conventionally, only the flight management system (FMS) needed to have a navigation solution. The term "navigation solution" indicates that the system has a means of accurately determining the aircraft's position, direction of travel and velocity. Thus, accurately knowing this navigation information, the FMS can guide the aircraft for at least some period of time if other navigation aiding systems or devices became temporarily inoperative or unreliable. Today however, many systems in an aircraft are required to have navigation solutions. Examples of systems within an aircraft which frequently require navigation solutions include heads up displays (HUDs), transponders (TDRs) for broadcasting position information, flight data recorders (FDRs), entertainment systems, and enhanced ground proximity warning systems (EGPWSs) for providing terrain relief maps.

A problem facing avionics engineers is that all of these navigation solution dependent devices must be synchronized so that they all come to the same conclusion as to the navigation solution for the aircraft. If the various navigation solution dependent systems are not synchronized in this respect, different systems can come to different conclusions as to the navigation solution for the aircraft. Another constraint encountered when attempting to add multi-sensor navigation solution functionality to existing systems is the computational capacity of the individual systems. This renders it difficult or impossible for the systems to function together in providing the flight crew reliable information regarding the aircraft.

Today, almost all navigation solution dependent systems have GPS ARINC-743A inputs for receiving GPS information from a GPS receiver. These navigation solution dependent systems also frequently have other inputs from other systems to aid in the generation of their navigation solutions. For example, other inputs can come from an inertial reference system (IRS), distance measuring equipment (DME), a variable omnirange receiver (VOR), and an air data computer (ADC) system. One problem with navigation solution dependent systems which determine a navigation solution based upon inputs from multiple other systems is that there is typically not enough capacity on the databuses which connect the various systems to handle all of the parameter data (often referred to as "labels"). Parameter data includes data such as altitude data, air speed data, latitude data and longitude data. Further, in order to facilitate the generation of navigation solutions in this manner, the electrical and software connections between the various systems becomes very complex. This renders it difficult to upgrade individual systems when desired.

While it would be desirable to determine a navigation solution based primarily upon data from a GPS receiver, it is difficult for GPS receiver data to alone satisfy the various navigation solution requirements. Generally, navigation solutions must satisfy the following four requirements: (1) accuracy; (2) integrity; (3) availability; and (4) continuity. These criteria vary based upon the aircraft situation and other factors. Examples of navigation solution standards can be found in the following documents:

(1) FAA Technical Standard Order TSO C-129, Airborne Supplemental Navigation Equipment using the Global Positioning System (GPS);

(2) FAA Technical Standard Order TSO C-115b, Airborne Area Navigation Equipment Using Multi-Sensor Inputs;

(3) FAA Advisory Circular AC 20-130, Multi-Sensor Navigation Systems for use in the U.S. National Airspace System (NAS) and Alaska;

(4) FAA Advisory Circular AC 90-45A, Approval of Area Navigation Systems for use in the U.S. National Airspace System;

(5) RTCA DO-208, Minimum Operational Performance Standards for Airborne Supplemental Navigation Equipment using Global Positioning System (GPS);

(6) RTCA DO-187, Minimum Operational Performance Standards for Airborne Supplemental Navigation Equipment Using Multi-Sensor Inputs;

(7) RTCA DO-217 Change 2, Minimum Avionics System Performance Standards DGNSS Instrument Approach System: Special Category 1 (SCAT-1);

(8) RTCA DO-229, Minimum Operational Performance Standards for Global Positioning System/Wide Area Augmentation System Airborne Equipment; and (9) FAA Notice N 8110.60, GPS as a primary Means of Navigation for Oceanic/Remote Operations.

The accuracy requirement of a navigation solution indicates the precision with which the navigation solution can predict the position or location of the aircraft. The integrity requirement is an error checking capability requirement. Closely correlated to the integrity requirement are the availability and continuity requirements. Availability relates to the percentage of the time that the navigation solution will be available. The continuity requirement relates to the percentage of the time that the navigation solution will remain available throughout an operation (for example a landing approach) once the operation has begun.

While GPS based navigation solutions are very accurate, they suffer problems with the correlated issues of integrity, availability and continuity. Based upon RTCA DO/208, *Minimum Operational Performance Standards for Airborne Supplemental Navigation Equipment Using Global Positioning System (GPS)*, July, 1991, GPS can be used as a supplemental navigation system, using the Receiver Autonomous Integrity Monitor (RAIM) algorithm for detection of failures. However, to be used for sole means of navigation, a system must have sufficient redundancy such that if a component fails, it can both be detected and isolated or excluded so that navigation can continue with other components. The GPS satellite constellation lacks the redundancy needed for RAIM to isolate or exclude failed satellites with sufficient availability for sole means.

The Litton Autonomous Integrity Monitored Extrapolation (AIME) algorithm described in the previously listed references, which are herein incorporated by reference, combines GPS data from a GPS receiver with IRS data to satisfy the four requirements of a navigation solution. The AIME algorithm uses IRS data and adaptive Kalman filters to lessen the number of GPS satellites required. Kalman filters have infinite memories, with all past inputs affecting the present output. Using AIME, both the present position output and the detection and isolation of failures depend on the entire history of GPS measurements. The result is that less GPS satellites are required for the AIME algorithm to function. Thus, with less GPS satellites required, the navigation solution availability and continuity requirements are satisfied.

A method of implementing GPS/IRS navigation solution algorithms, such as the Litton AIME algorithm, is to provide a GPS input to the IRS where the algorithm is implemented. Then, the IRS can provide both a normal IRS output and a hybrid IRS output. The hybrid IRS output is an IRS output which is augmented with the GPS data to provide a navigation solution. Then, each system within the aircraft requiring an integrated navigation solution must receive and process the hybrid IRS output as a new input into their multi-sensor navigation solution. One problem with this method of implementation of a GPS/IRS navigation solution algorithm is that there frequently is insufficient databus or computational capacity for the hybrid IRS output parameter data to be received and/or processed by the various systems. An alternative to this method is to implement the GPS/IRS navigation solution algorithm in another apparatus, such as in the FMS, instead of in the IRS. However, both methods require extensive software changes to the FMS or other apparatus. Since the FMS typically includes several hundred thousand lines of code in its software, these methods are very difficult to implement. A second problem with this method of implementation is that the extensive modification and re-certification required to the number of systems affected can easily prove to be cost and schedule prohibitive. Consequently, a method of implementing a GPS/IRS navigation solution algorithm which overcomes these and other problems would be a significant advance in the art.

SUMMARY OF THE INVENTION

A global navigation satellite system (GNSS) receiver for use in an aircraft is disclosed. The GNSS receiver includes receiver circuitry for receiving satellite signals containing satellite data from multiple GNSS satellites. The receiver circuitry generates a first navigation solution for the aircraft as function of the satellite data. A first GNSS receiver output couples to an inertial reference system (IRS) and provides the satellite data to the IRS. The IRS generates a second navigation solution for the aircraft as a function of the satellite data and as a function of IRS position data. A first GNSS receiver input couples to the IRS and receives the second navigation solution from the IRS. At a second GNSS receiver output, the GNSS receiver provides aircraft position information as a function of the second navigation solution.

BRIEF DESCRIPTION OF THE DRAWINGS

The invention may be more fully understood by reading the following description of a preferred embodiment of the invention, in conjunction with the appended drawings wherein.

DETAILED DESCRIPTION OF THE PREFERRED EMBODIMENTS

Figure 1:
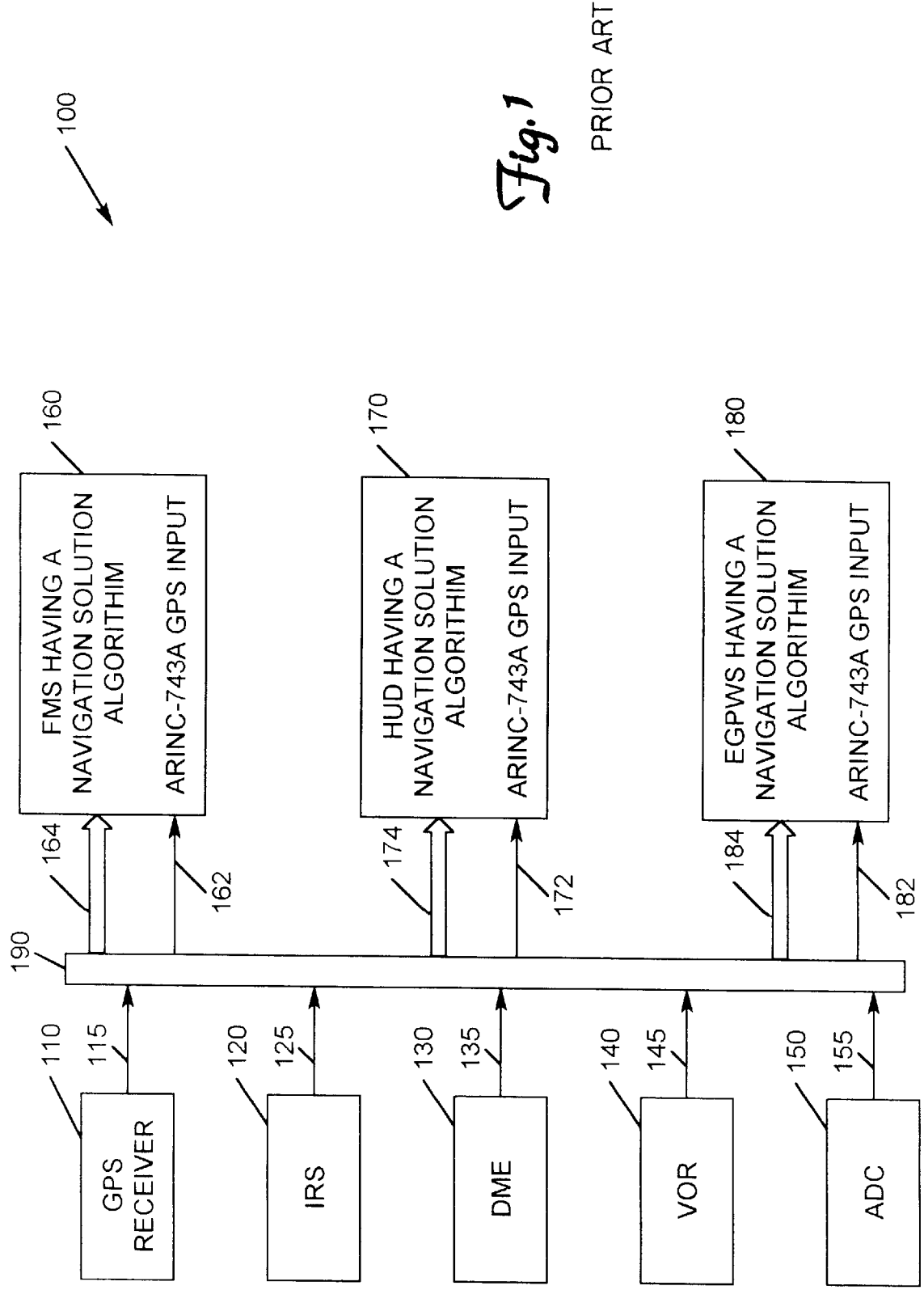
FIG. 1 is a block diagram illustrating a first prior art avionics system without the benefit of the present invention.

FIG. 1 is a block diagram illustrating prior art avionics system 100. Avionics system 100 can include any number of known avionics devices, subsystems or LRUs. By way of example, prior art avionics system 100 includes GPS receiver 110, IRS 120, DME 130, VOR 140, ADC 150, FMS 160, HUD 170, EGPWS 180 and router 190. GPS receiver 110 includes receiver circuitry for receiving signals from the GPS satellite constellation. GPS receiver 110 uses the satellite data contained in the satellite signals to generate position information which is provided at output 115 to router 190. As is known in the art, the RAIM algorithm can be used to detect errors in the GPS information. Router 190 is coupled to GPS inputs 162, 172 and 182 of FMS 160, HUD 170 and EGPWS 180, respectively. Each of inputs 162, 172 and 182 is typically a standard GPS input such as an ARINC-743A GPS input.

Each of FMS 160, HUD 170 and EGPWS 180 needs a navigation solution to perform its respective intended functions. Since, as discussed above, GNSS receivers using only the GPS satellite constellation cannot alone produce a navigation solution which satisfies the requirements of availability and continuity, FMS 160, HUD 170 and EGPWS 180 cannot produce navigation solutions based solely on data received from GPS receiver 110. In other words, GPS receiver 110 cannot act as a sole means in providing a navigation solution.

As is well known in the art, IRS 120, DME 130, VOR 140 and ADC 150 produce signals or data which is useful for various purposes, particularly related to navigating the aircraft on which avionics system 100 is installed. IRS 120 provides data to router 190 via output 125. DME 130 provides data to router 190 via output 135. VOR 140 provides data to router 190 via output 145. ADC 150 provides data to router 190 via output 155. FMS 160, HUD 170 and EGPWS 180 have inputs 164, 174 and 184 coupled to router 190 for receiving data from other subsystems such as IRS 120, DME 130, VOR 140 and ADC 150. Using the information from two or more of GPS receiver 110, IRS 120, DME 130, VOR 140 and ADC 150, each of FMS 160, HUD 170 and EGPWS 180 implements an algorithm for generating a navigation solution. The algorithm implemented by FMS 160, HUD 170 and EGPWS 180 can be the AIME algorithm described above or any other suitable navigation solution algorithm.

Avionics system 100 has a number of disadvantages which the present invention overcomes. First, since each of FMS 160, HUD 170 and EGPWS 180 produce their own navigation solutions, the potential for differences between the various navigation solutions exists. Further, the software and/or hardware changes required to each of FMS 160, HUD 170 and EGPWS 180 in order to implement the navigation solution algorithms are significant. System upgrades in any of the components can result in very significant changes throughout the system.

Figure 2:
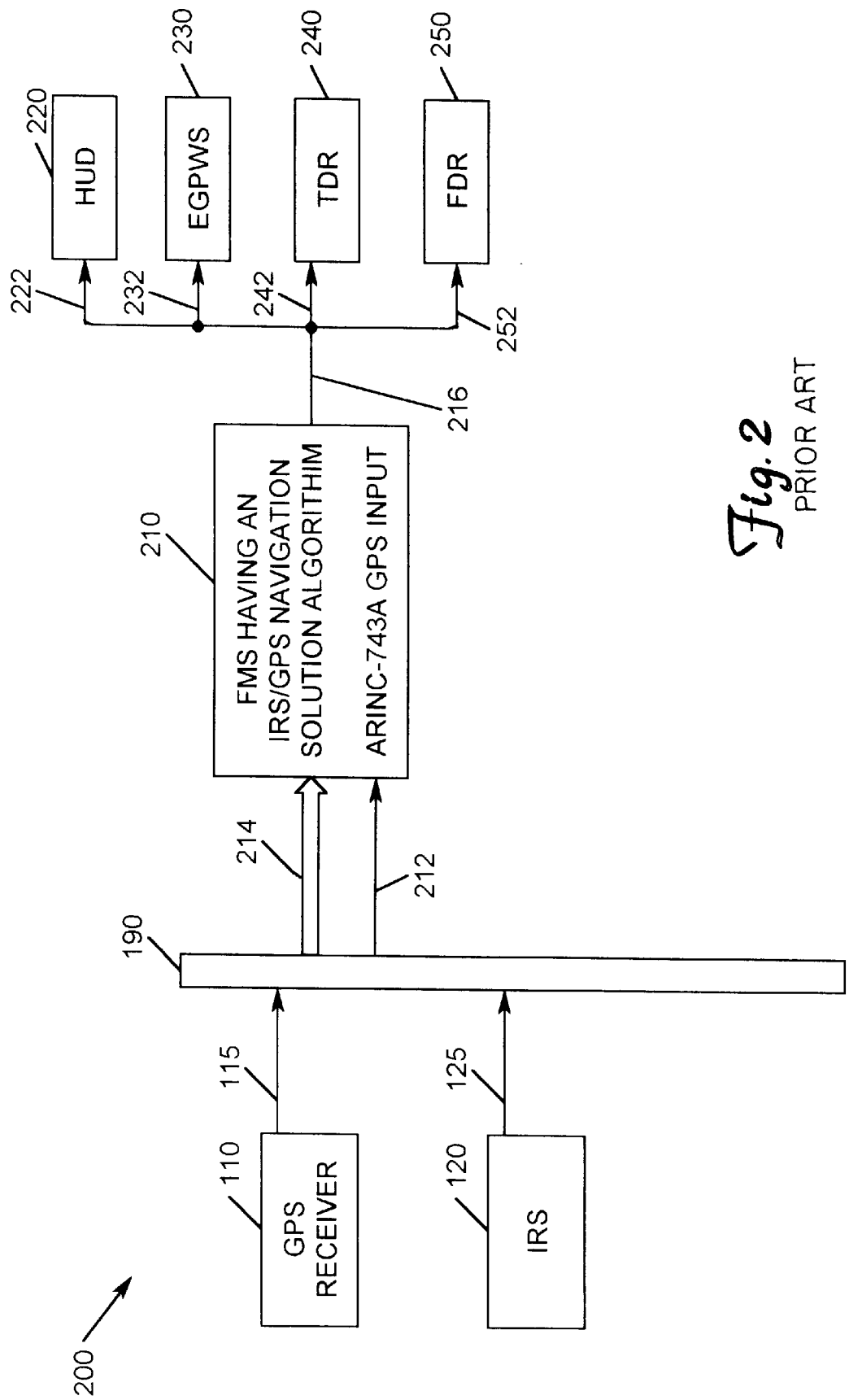
FIG. 2 is a block diagram illustrating a second prior art avionics system without the benefit of the present invention.

FIG. 2 is a block diagram of a prior art avionics system 200 which is used, and/or has been proposed, to eliminate some of the disadvantages associated with prior art avionics system 100 illustrated in FIG. 1. Illustrated in avionics system 200 are GNSS or GPS receiver 110, IRS 120, router 190, FMS 210, HUD 220, EGPWS 230, TDR 240 and FDR 250. GPS generated position information or data is provided at GPS output 115 to databus or router 190 for distribution to other subsystems or devices. GPS data from GPS receiver 110 is provided to FMS 210 via standard GPS input 212. IRS 120 is coupled to router 190 via output 125. Data from IRS 120 and other subsystems (not shown) of system 200 are provided to FMS 210 via inputs 214.

FMS 210 differs from FMS 160 illustrated in FIG. 1 in that it is adapted to implement a GPS/IRS navigation solution algorithm such as the Litton AIME algorithm discussed above and described thoroughly in the documents incorporated by reference in this application. In other words, the FMS of system 200 functions as the AIME navigation apparatus illustrated in FIG. 1 of U.S. Pat. No. 5,583,774. A second possible implementation would be for FMS 210 to receive a hybrid IRS output via output 125 and input 214 for processing as an additional input into the multi-sensor navigation solution of FMS 210. FMS 210 generates a navigation solution and provides the navigation solution at output 216 to HUD 220, EGPWS 230, TDR 240 and FDR 250 via inputs 222, 232, 242 and 252, respectively.

System 200 differs from system 100 primarily in the following ways. First, by implementing a GPS/IRS navigation solution algorithm such as the AIME algorithm, some of the other navigation aiding systems (for example, DME and VOR) can be eliminated This is primarily due to the high quality of the GPS/IRS based navigation solution algorithm. A further advantage of system 200 over system 100 is that, by having FMS 210 generate the navigation solution and provide it to other subsystems such as HUD 220, EGPWS 230, TDR 240 and FDR 250, the problem of different subsystems generating different and non-synchronized navigation solutions is eliminated. Further, since HUD 220, EGPWS 230, PDR 240 and FDR 250 are no longer required to generate their own navigation solutions, the complexity of these subsystems can be reduced significantly.

Despite some advantages of avionics system 200 over avionics system 100, avionics system 200 still has a number of disadvantages. For example, for FMS 210 to include the capability of generating the navigation solution, significant software and/or hardware changes to FMS 210 are required. Considering the huge number of lines of software code already present in a typical FMS, this is an unattractive proposition. Also, since the FMS is in series with providing the integrated navigation solution to all other systems, the criticality of the FMS must equal or exceed the most stringent user systems requirements. For example, if HUD 220 were to require a critical level navigation solution, then FMS 210 would be required to be certified as a critical level system. All FMS systems that are commercially available today are only certified as non-essential systems. The cost and schedule associated with producing an FMS which can be certified to an essential or critical level is prohibitive.

Another method of generating a navigation solution using a GPS/IRS based algorithm, such as the AIME algorithm, is to implement the algorithm within the IRS itself. In other words, the IRS can receive the satellite data from the GPS receiver and produce a hybrid IRS output which contains a navigation solution satisfying the four previously described requirements. However, for backwards compatibility and other reasons, it will usually be necessary for the IRS to provide both a hybrid output (i.e., an output augmented with the AIME or other algorithm to provide a navigation solution satisfying all requirements) and the conventional non-augmented IRS output. This provides several disadvantages. First, there is frequently insufficient router capacity for both the hybrid IRS labels (hybrid parameter data pertaining to the navigation solution) and the conventional IRS labels or parameter data. Second, there is frequently insufficient databus and/or computational capacity within each system requiring an integrated navigation solution to receive and process the hybrid IRS output as a new input into their own multi-sensor navigation solution. Further, the modifications to the FMS necessary in order to accommodate both the conventional IRS and the hybrid IRS data are extensive. As discussed previously, the already complex FMS software code does not lend itself well to this solution.

Figure 3:
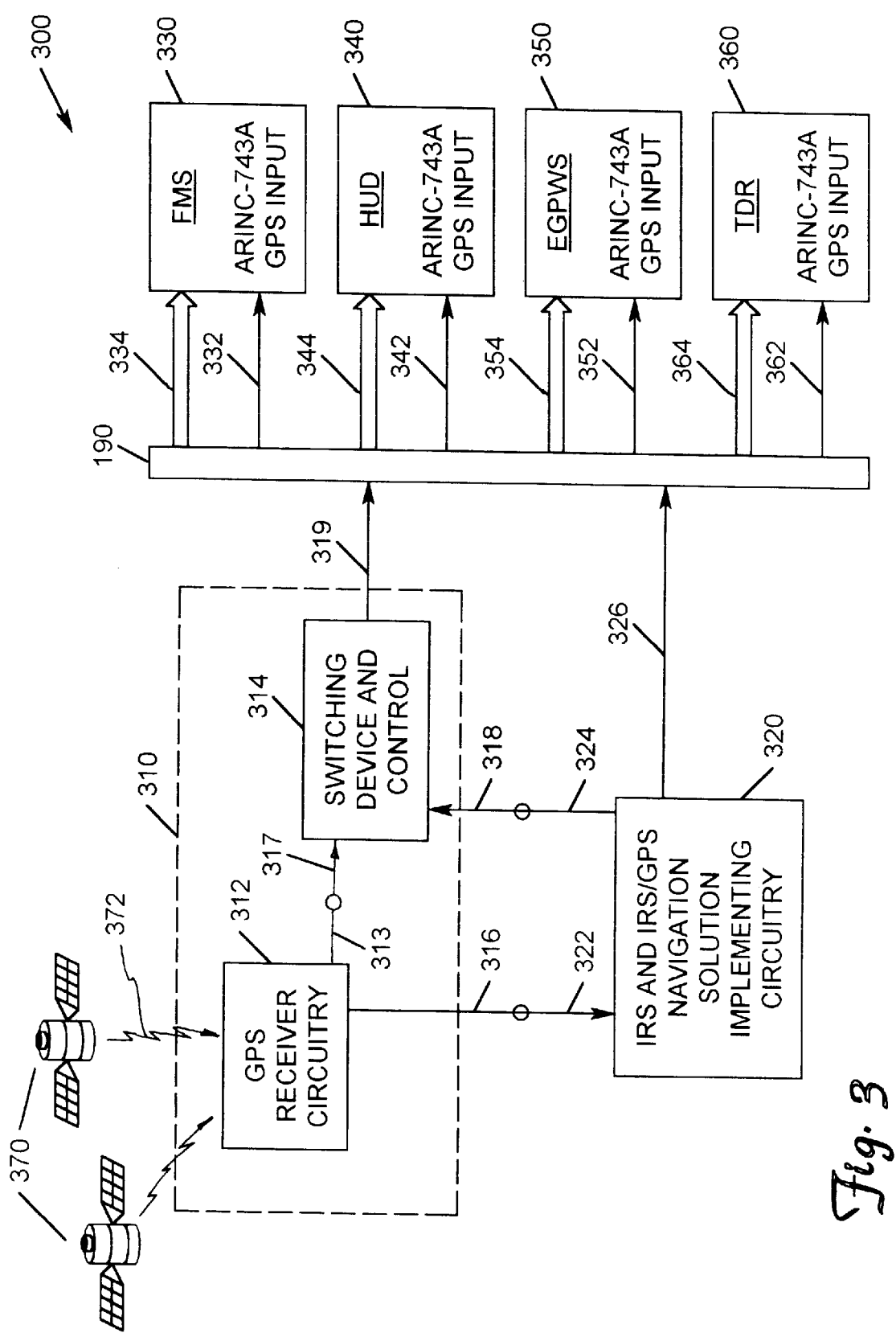
FIG. 3 is a block diagram illustrating an avionics system which utilizes a GNSS or GPS receiver having a navigation solution in accordance with preferred embodiments of the present invention.

FIG. 3 is a block diagram of avionics system 300 in accordance with preferred embodiments of the present invention. Along with other subsystems which are not shown in FIG. 3, avionics system 300 includes GPS receiver 310, IRS 320, router 190, FMS 330, HUD 340, EGPWS 350 and TDR 360. It is assumed that each of FMS 330, HUD 340, EGPWS 350 and TDR 360 requires a navigation solution.

As is typically the case, each of FMS 330, HUD 340, EGPWS 350, TDR 360 and other subsystems have a standardized GPS input such as an ARINC-743A GPS input. These inputs are illustrated in FIG. 3 as inputs 332, 342, 352 and 362 for FMS 330, HUD 340, EGPWS 350 and TDR 360, respectively. Further, IRS 320 includes standard GPS input 322. These various devices receive GPS data via their respective GPS inputs.

GPS receiver 310 includes GPS receiver circuitry 312 and switching device 314. Switching device 314 has associated control circuitry, such as a microprocessor, for controlling the switching device as described below. GPS receiver circuitry 312 receives signals 372 from multiple GPS satellites 370 in the GPS satellite constellation. Signals 372 contain satellite data which is used by GPS receiver circuitry 312 to produce GPS position information, as is known in the art. GPS receiver circuitry 312 can include a microprocessor for implementing a navigation solution algorithm, such as the RAIM algorithm. GPS receiver circuitry 312 includes a first output 313 which is coupled to first input 317 of switching device 314. Through the connection of GPS receiver circuitry output 313 and switching device input 317, GPS receiver circuitry 312 provides GPS position information (for example in the form of a first navigation solution) to switching device 314.

GPS receiver circuitry 312 also provides, to GPS receiver output 316, the original GPS satellite data retrieved from satellite signal 372. With output 316 of GPS receiver 310 coupled to input 322 of IRS 320, this original satellite data is provided to IRS 320 for use in generating a navigation solution. IRS 320 includes GPS/IRS navigation solution implementing circuitry for implementing a navigation solution algorithm such as the AIME algorithm discussed above. IRS 320 uses the GPS satellite data in combination with IRS data to produce a navigation solution which satisfies the four navigation solution requirements. While in preferred embodiments IRS 320 implements the AIME navigation solution algorithm discussed above, in another embodiment IRS 320 can implement other navigation solutions and algorithms which utilize IRS data in combination with GPS data to generate a reliable navigation solution. Further, while the navigation solution algorithm is preferably implemented within IRS 320, a separate navigation solution generating apparatus can be included for this purpose. In this instance, the separate apparatus would receive the original GPS data and the IRS data and generate an GPS/IRS based navigation solution.

IRS 320 includes first IRS output 324 and second IRS output 326. Physically, outputs 324 and 326 of IRS 320 can be the same or separate databuses. First IRS output 324 is coupled to input 318 of GPS receiver 310, and thereby to switching device 314. Second output 326 of IRS 320 is coupled to databus or router 190. While IRS 320 provides a hybrid IRS signal at output 324, containing the second navigation solution based upon GPS/IRS data, IRS 320 also provides a standard IRS output of the type known in the art at output 326. Via connections 334, 344, 354 and 364, FMS 330, HUD 340, EGPWS 350 and TDR 360 receive the conventional IRS data provided at output 326.

Switching device 314 of GPS receiver 310 receives as input two separate navigation solutions, one from GPS receiver 312 via input 317 and one from IRS 320 via input 318. As discussed below in further detail, switching device 314 provides a GPS data output at GPS receiver output 319. The GPS data output is based upon, or is indicative of, the higher quality one of the first and second navigation solutions. Output 319 of GPS receiver 310 is coupled to router 190. Standard GPS inputs 332, 342, 352 and 362 are included on each of FMS 330, HUD 340, EGPWS 350 and TDR 360, respectively, as is conventional in avionics systems. Thus, the GPS information at output 319 is provided to each of these navigation solution dependent devices.

GPS receiver 310 and avionics system 300 differ from the GPS receivers and avionics systems illustrated in FIGS. 1 and 2, as well as from those discussed in the previously referenced documents, in a number of ways which will become more apparent in the following discussion. Avionics system 300 functions generally as follows. GPS receiver circuitry 312 uses the satellite data contained in received satellite signals 372 in a conventional manner to generate GPS position information. If desired, the position information can be indicative of the results of a navigation solution algorithm such as the RAIM algorithm.

However, unlike conventional GPS receivers, GPS receiver 310 does not automatically provide the generated GPS position information (i.e., the first navigation solution) at output 319 for use by the other subsystems of avionics system 300. Instead, GPS circuitry 312 provides the raw satellite data at GPS receiver output 316 to input 322 of IRS 320. In a conventional manner, IRS 320 produces IRS data, which does not necessarily contain a navigation solution, and provides this conventional IRS data at output 326 for use by the rest of the system. As discussed in the previously referenced documents, IRS 320 implements a GPS/IRS navigation solution algorithm to produce a high quality navigation solution for the aircraft in which system 300 is installed. In preferred embodiments, the navigation solution algorithm is the AIME algorithm. However, other algorithms, based upon the use of Kalman filters or otherwise, can be used as well.

In contrast to the prior art in which the hybrid IRS signals or data (containing the GPS/IRS navigation solution) is supplied via router 190 and processed by the various other subsystems, in avionics system 300, only the conventional IRS data is supplied by router 190 and processed by the various other subsystems. Depending upon the quality of the position information produced by GPS receiver circuitry 312 (i.e., the first navigation solution) and of the quality of the navigation solution produced by IRS 320 (i.e., the second navigation), GPS 310 provides the better of the two navigation solutions (or a best combination of the two navigation solutions) to the rest of the system via output 319.

The quality of a navigation solution can be ascertained from integrity limit data associated with the navigation solution and generated by the device which generates the navigation solution. Generally, the lower the value associated with the integrity limit data of a navigation solution, the higher the quality of the associated navigation solution. Integrity limit data typically includes a horizontal integrity limit (HIL) and a vertical integrity limit (VIL). Switching device 314 can be controlled by the associated control circuitry or software, using the integrity limit data, to provide at output 319 the one of the first and second navigation solutions which has a lower integrity limit value. Generally, in the case of a GNSS using only the GPS satellite constellation, the value of the integrity limit data associated with the navigation solution generated by IRS 320 will virtually always be lower than the value of the integrity limit data associated with the navigation solution generated by GPS receiver circuitry 312. In other words, the navigation solution generated using the AIME algorithm will be better than the navigation solution generated using the RAIM algorithm. However, as additional satellites are added to the GPS satellite constellation, or if additional satellite constellations are combined with the GPS satellite constellation, this may not always be the case.

The GPS receiver and avionics system of the present invention provides numerous advantages over the prior art. For example, since each of the FMS, HUD, EGPWS and TDR receive a reliable navigation solution at their standard GPS input, no software changes are required to any of these subsystems. As was the case in the prior art, the GPS data is provided to the subsystems, but using the present invention the GPS data qualifies globally as a primary means navigation solution. Also since it is not necessary to transmit both IRS and hybrid IRS signals through router 190, the data transfer capacity requirements of router 190 can be lessened. Further, since pilots are provided with a single mode of navigation, pilot training can be greatly simplified since VORs, DMEs and other subsystems could be removed from the aircraft. The present invention provides a low complexity method of integrating the AIME algorithm into existing aircraft systems with minimal changes. In doing so, the present invention provides a reduced cost method of producing a navigation solution with high levels of accuracy, integrity, availability and continuity.

Although the present invention has been described with reference to preferred embodiments, workers skilled in the art will recognize that changes may be made in form and detail without departing from the spirit and scope of the invention.

What is claimed is:

1. A global navigation satellite system (GNSS) receiver for use in an aircraft, the GNSS receiver comprising:

receiver circuitry for receiving satellite signals from a plurality of satellites, wherein the satellite signals contain satellite data, the receiver circuitry generating a first navigation solution for the aircraft as function of the satellite data;

a first receiver output for coupling to an inertial reference system (IRS) and providing the satellite data to the IRS, wherein the IRS to which the first receiver output couples generates a second navigation solution as a function of the satellite data and as a function of IRS position data;

a first receiver input for coupling to the IRS and receiving the second navigation solution from the IRS; and a second receiver output for coupling to GNSS inputs of other systems in the aircraft, wherein the GNSS receiver provides at the second receiver output aircraft position information as a function of the second navigation solution.

2. The GNSS receiver of claim 1, wherein the position information provided at the second GNSS receiver output is indicative of the second navigation solution.

3. The GNSS receiver of claim 1, wherein each of the first and second navigation solutions are indicative of the position of the aircraft.

4. The GNSS receiver of claim 3, wherein the GNSS receiver provides at the second receiver output the position information also as a function of the first navigation solution.

5. The GNSS receiver of claim 4, wherein each of the first and second navigation solutions include integrity limit data having a value associated therewith, wherein the integrity limit data of each of the first and second navigation solutions is indicative of a quality of the respective ones of the first and second navigation solutions, wherein the position information provided at the second output is indicative of the first navigation solution if the value associated with the integrity limit data of the first navigation solution is less than the value associated with the integrity limit data of the second navigation solution, and wherein the position information provided at the second output is indicative of the second navigation solution if the value associated with the integrity limit data of the second navigation solution is less than the value associated with the integrity limit data of the first navigation solution.

6. The GNSS receiver of claim 5, wherein the satellites are global positioning system (GPS) satellites and the GNSS receiver is a GPS receiver.

7. The GNSS receiver of claim 6, wherein the receiver circuitry generates the first navigation solution using the RAIM algorithm.

8. The GNSS receiver of claim 6, wherein the second navigation solution is a navigation solution generated using the AIME algorithm.

9. A global positioning system (GPS) receiver for use in an aircraft, the GPS receiver comprising:

receiver circuitry for receiving satellite signals from a plurality of satellites, wherein the satellite signals contain satellite data;

a first receiver output for coupling to an inertial reference system (IRS) and providing the satellite data to the IRS, wherein the IRS to which the first receiver output couples generates a first navigation solution as a function of the satellite data and as a function of IRS position data;

a first receiver input for coupling to the IRS and receiving the first navigation solution from the IRS; and a second receiver output for coupling to GPS inputs of other systems in the aircraft, wherein the GPS receiver provides at the second receiver output aircraft position information as a function of the first navigation solution.

10. The GPS receiver of claim 9, wherein the first navigation solution is a navigation solution generated using the AIME algorithm.

11. The GPS receiver of claim 10, wherein the receiver circuitry further generates a second navigation solution for the aircraft as function of the satellite data, wherein each of the first and second navigation solutions are indicative of the position of the aircraft, wherein the GPS receiver provides at the second GPS receiver output the position information also as a function of the second navigation solution.

12. The GPS receiver of claim 11, and further comprising a switching device having a first switching device input coupled to the GPS receiver circuitry and receiving the second navigation solution and having a second switching device input coupled to the first receiver input and receiving the first navigation solution from the IRS, the switching device having an output coupled to the second receiver output, wherein the switching device is controlled to selectively provide at the second receiver output aircraft position information indicative of one of the first and second navigation solutions.

13. The GNSS receiver of claim 12, wherein each of the first and second navigation solutions include integrity limit data having a value associated therewith, wherein the integrity limit data of each of the first and second navigation solutions is indicative of a quality of the respective ones of the first and second navigation solutions, wherein the switching device is controlled such that position information provided at the second output is indicative of the first navigation solution if the value associated with the integrity limit data of the first navigation solution is less than the value associated with the integrity limit data of the second navigation solution, and such that the position information provided at the second output is indicative of the second navigation solution if the value associated with the integrity limit data of the second navigation solution is less than the value associated with the integrity limit data of the first navigation solution.

14. The GPS receiver of claim 13, wherein the receiver circuitry generates the second navigation solution using the RAIM algorithm.

15. A global positioning system (GPS) receiver for use in an aircraft, the GPS receiver comprising:

receiver circuitry for receiving satellite signals from a plurality of satellites, wherein the satellite signals contain satellite data;

a first receiver output for coupling to a first externally positioned navigation solution generating device and providing the satellite data to the first externally positioned navigation solution generating device, wherein the first navigation solution generating device generates a first navigation solution for the aircraft as a function of the satellite data;

a first receiver input for coupling to the first externally positioned navigation solution generating device and receiving the first navigation solution from the first navigation solution generating device; and a second receiver output for coupling to GPS inputs of other systems in the aircraft, wherein the GPS receiver provides at the second receiver output aircraft position information as a function of the first navigation solution generated by the first navigation solution generating device.

16. The GPS receiver of claim 15, wherein the first navigation solution is generated using the AIME algorithm.

17. The GPS receiver of claim 16, wherein the first navigation solution generating device is an inertial reference system (IRS) which implements the AIME algorithm and wherein the first receiver output and the first receiver input are adapted for coupling to the IRS.

18. The GPS receiver of claim 17, wherein the receiver circuitry further generates a second navigation solution for the aircraft as function of the satellite data, wherein each of the first and second navigation solutions are indicative of the position of the aircraft, wherein the GPS receiver provides at the second GPS receiver output the position information also as a function of the second navigation solution.

19. The GPS receiver of claim 18, and further comprising a switching device having a first switching device input coupled to the GPS receiver circuitry and receiving the second navigation solution and having a second switching device input coupled to the first receiver input and receiving the first navigation solution from the IRS, the switching device having an output coupled to the second receiver output, wherein the switching device is controlled to selectively provide at the second receiver output aircraft position information indicative of one of the first and second navigation solutions.

20. The GNSS receiver of claim 19, wherein each of the first and second navigation solutions include integrity limit data having a value associated therewith, wherein the integrity limit data of each of the first and second navigation solutions is indicative of a quality of the respective ones of the first and second navigation solutions, wherein the switching device is controlled such that position information provided at the second output is indicative of the first navigation solution if the value associated with the integrity limit data of the first navigation solution is less than the value associated with the integrity limit data of the second navigation solution, and such that the position information provided at the second output is indicative of the second navigation solution if the value associated with the integrity limit data of the second navigation solution is less than the value associated with the integrity limit data of the first navigation solution.

* * * * *